United States Patent [19]

Murai et al.

[11] Patent Number: 4,675,814
[45] Date of Patent: Jun. 23, 1987

[54] METHOD OF SWITCHING OPERATING SYSTEMS FOR A DATA PROCESSING SYSTEM

[75] Inventors: Masami Murai, Owariasahi; Masanori Hashio, Aichi; Yousuke Tsuyuki, Owariasahi; Tsutomu Kaneko, Seto, all of Japan

[73] Assignee: Hitachi, Ltd., Tokyo, Japan

[21] Appl. No.: 686,596

[22] Filed: Dec. 26, 1984

[30] Foreign Application Priority Data

Dec. 26, 1983 [JP] Japan ............................... 58-243921

[51] Int. Cl.4 ............................................. G06F 9/46
[52] U.S. Cl. .................................................. 364/300
[58] Field of Search ......................................... 364/300

[56] References Cited
U.S. PATENT DOCUMENTS
4,493,034  1/1985  Angelle et al. ............... 364/300 X Primary Examiner—Raulfe B. Zache
Attorney, Agent, or Firm—Antonelli, Terry & Wands

[57] ABSTRACT

A data processing system in which one of several operating systems (OS) stored in the auxiliary storage is selectively loaded to the main storage so that an application program is run under the selected operating system. Each operating system is provided with a function of loading a new operating system to the main storage in response to the OS switching instruction issued as an operator command or a job control statement. The improved OS switching method eliminates time used to verify memory repeatedly and to load data sets used commonly by each operating system.

10 Claims, 7 Drawing Figures

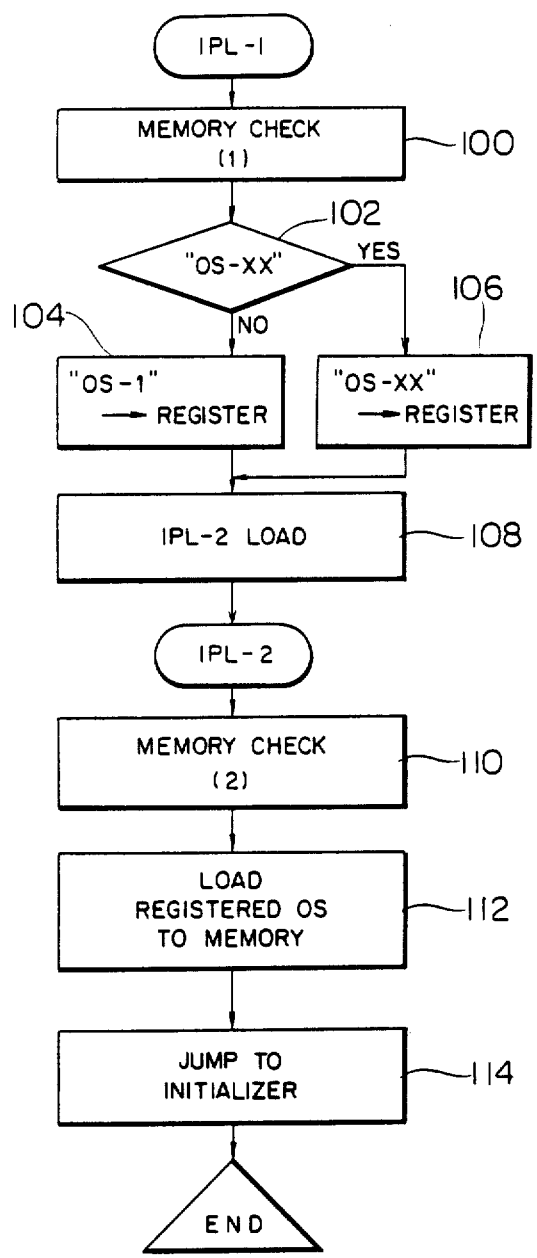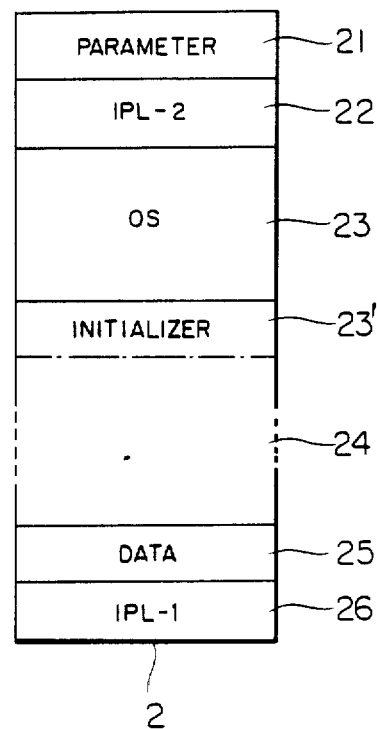

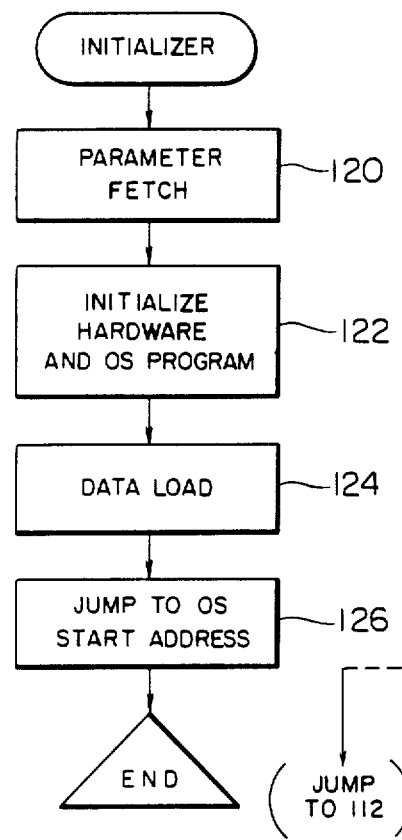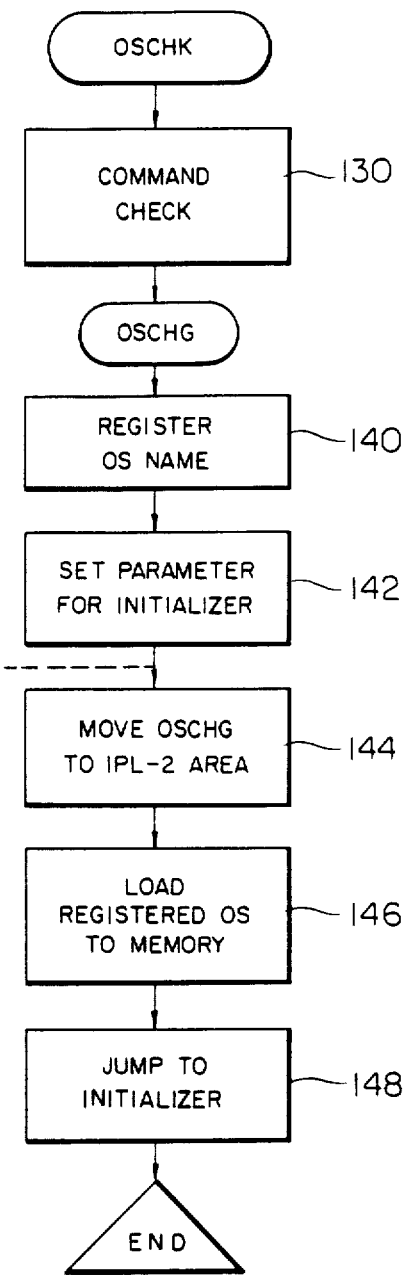

METHOD OF SWITCHING OPERATING SYSTEMS FOR A DATA PROCESSING SYSTEM

BACKGROUND OF THE INVENTION

1. Field of the Invention

The present invention relates to a method of switching operating systems (hereinafter simply referred to as "OS") for a data processing system and, more particularly, to an OS switching method for a data processing system in which one of the operating systems stored in the auxiliary storage is selectively loaded into the main storage depending on the usage of the data processing system so that it is operated for many purposes.

2. Description of the Prior Art

The recent advances in semiconductor technology have brought increased use of office automation facilities such as word processors and personal computers using sophisticated microprocessors integrated in a tiny chip. As for the computerization of the business office, there are generally installed several on-line terminal devices connected to a host computer, and other office automation facilities such as word processors as mentioned above are used for local data processing in each office independently of the on-line computer system. However, in order to avoid the multiple installation of similar hardware devices including on-line terminals, word processors and personal computers for much efficient use of the office, it is desirable for an on-line terminal device to have multi-purpose functions including capabilities of a word processor and personal computer for dealing with local data processing.

In order for the data processing system to perform such multi-functional operations, it is necessary to replace the operating system in the main storage for each purpose. For example, an operating system EMP (Emulation Program*) is used when a terminal device is used for real time data processing in a interactive mode, MS-DOS (trademark of Microsoft Inc., U.S.A.) is used when a terminal device is used as a personal computer, WPS (Word Processing System*) including the character conversion function and learning function is used when it is used as a word processor, or BTOS (Business Terminal Operating System*) is used when it is used as an intelligent terminal for entering local data into the data base of the host computer. (Note: Operating systems marked by "*" are products of Hitachi Ltd., Japan)

Conventionally, the operating system stored in the auxiliary storage is loaded to the main storage by the Initial Program Loader (IPL). Accordingly, when the system is intended to operate under one of several operating systems stored in the auxiliary storage depending on each usage, the overall contents of the main storage are renewed each time in such a way that the operator resets the system, activates the IPL, and specifies through the keyboard the operation system to be loaded, so that the system starts with the execution of IPL. After the operating system has been loaded to the main storage, data sets associated with the OS such as dictionary data and data for character generation are also loaded from the auxiliary storage to the main storage.

According to the conventional method for dealing with operating systems, a data set needed by a new operating system is automatically loaded from the auxiliary storage to the main storage even if it already resides in the main storage as an accompaniment of the previous operating system. In addition, even though the main storage has been checked at the loading of the previous operating system, it is checked again in the new OS loading operation beginning with IPL. That is, the conventional method involves unnecessary steps of start-up procedure each time the operating system is replaced. The operator's system reset action abruptly terminates a job in execution, resulting possibly in an improper abortion of the processing.

SUMMARY OF THE INVENTION

An object of the present invention is to provide an improved method of switching operating systems for providing multi-purpose functions for a single data processing system.

Another object of the invention is to provide a method of switching operating systems capable of loading a new operating system to the main storage of a data processing system automatically or through a simple operator's action.

Still another object of the invention is to provide a method of switching operating systems capable of replacing the operating system in a minimal time needed for the OS switching operation.

In order to achieve the above objectives, the present invention resides characteristically in a method of switching operating systems for a data processing system having first memory means for storing a plurality of operating systems each having a specific file name and a plurality of data sets, second memory means having a first area for storing an operating system, a second area for storing a data set used by the operating system, a third area for temporarily storing a processing program to be executed and a fourth area for storing a program which loads a selected operating system from the first memory means to the first area, and third means for instructing the loading of an operating system with a specified file name from the first memory means to the second memory means, so that the processing program stored in the third area of the second memory means is executed under control of the operating system loaded to the first area, wherein the method comprises: the first step of checking the load instruction issued by the third means using a first program section in the operating system stored in the second memory means and, if the load instruction is acceptable, preparing a parameter indicating the content of the second area of the second memory means, the second step of executing the program in the fourth area so that a new operating system with a file name specified by the third means is loaded from the first memory means to the first area of the second memory means, and the third step carried out by the second program section of the newly loaded operating system prior to the execution of the processing program, of loading a data set, which is necessary for the new operating system and has not been loaded yet, from the first memory means to the second area of the second means, while making reference to the parameter prepared by the previous operating system.

In the above OS switching method, the third means is, for example, a keyboard unit, the OS switching instruction is entered as an operator command, and the first step is executed in response to a keyboard interrupt event.

According to another form the present invention, for example, in case the next operating system to be loaded is already determined when data processing by one operating system is completed, the above third means is formed by a job control statement in a cataloged procedure used for indicating the control sequence of a program processed by the previous operating system, and a new operating system is loaded automatically without operator intervention at the execution of the job control statement.

These and other objects, advantages and features of the present invention will become more apparent from the following detailed description taken in conjunction with the accompanying drawings.

BRIEF DESCRIPTION OF THE DRAWINGS

FIG. 3 is a chart used to explain the allocation of the main storage;

FIG. 4 is a flow chart showing the operation of the initial program loader (IPL);

FIG. 5 is a flow chart showing the operation of the initializing routine which is loaded together with the operating system to the main storage;

FIG. 6 is a flow chart showing the operation of the subroutine carrying out the switching of operating systems.

DESCRIPTION OF THE PREFERRED EMBODIMENT

Figure 1:
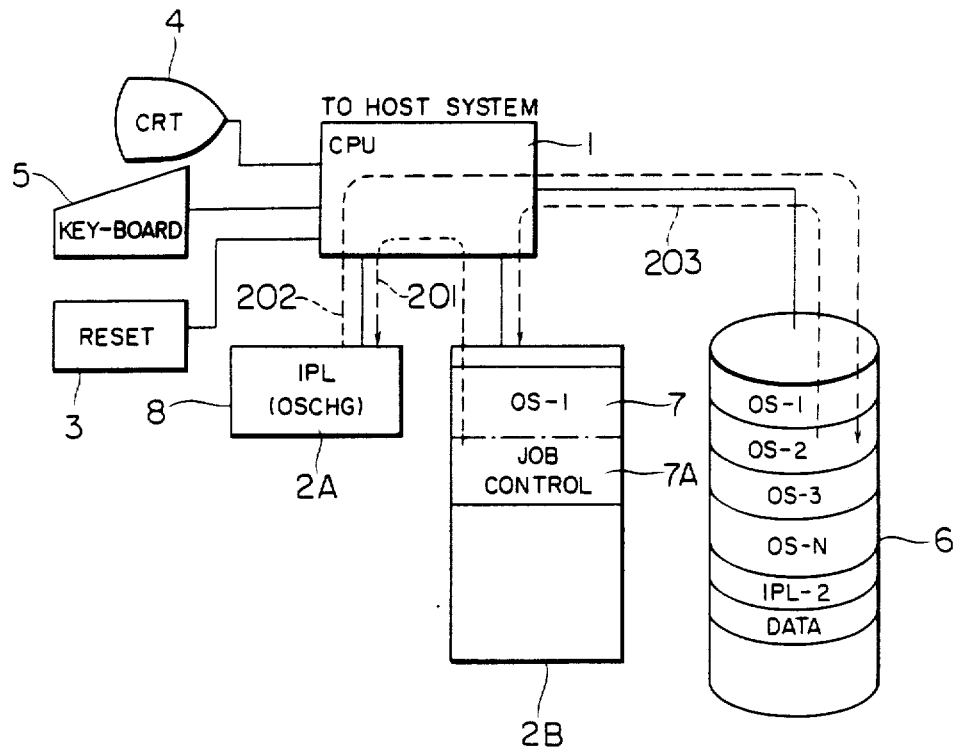
FIG. 1 is a block diagram showing the general arrangement of the data processing system to which this invention is applied, and also explaining the concept of an OS switching operation.

The general arrangement of the data processing system, to which this invention is applied, as shown in FIG. 1, includes a CPU 1, a main storage 2 (2A, 2B), a system reset key 3, a CRT display unit 4, a keyboard 5 for entering data and commands, and a disk type auxiliary storage 6.

The initial program loader (IPL), which is stored in a certain location of the main storage 2, is executed immediately after the system has been turned on or the reset key 3 has been pressed, and the IPL operates to load an operating system (OS-1) 7 from the auxiliary storage 6 to the main storage 2B, as shown in FIG. 1.

Figure 2:
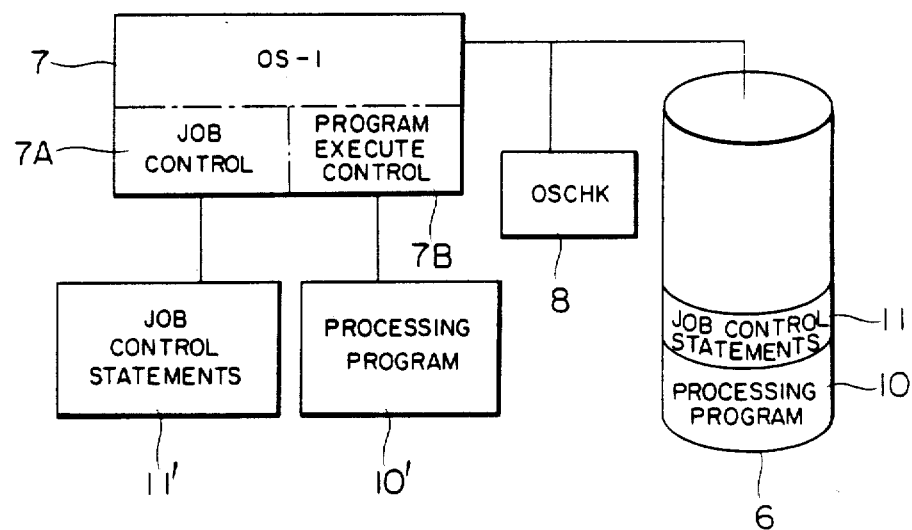
FIG. 2 is a block diagram used to explain the relationship between the processing program and the operating system.

A processing program 10 describing the procedure of a user's job and a cataloged procedure 11 made up of job control statements specifying the job control procedure of the processing program are stored in the auxiliary storage 6 as shown in FIG. 2, and they are loaded to the main storage by the OS-1 when necessary. Each operating system is made to have a job control 7A which generates tasks in accordance with the job control statements 11' and a program execute control 7B which executes the tasks for the processing program 10'.

In this embodiment, the job control 7A is provided with the OS switching function. For example, in case the operation of the data processing system has been scheduled in advance and OS-1 is automatically followed by OS-2, the OS switching to OS-2 is specified by the last job control statement of the cataloged procedure, so that the new operating system is loaded to the main storage successively, as shown by the dashed arrows 201, 202 and 203 in FIG. 1, when the statement is executed by the job control 7A. The operating system to be loaded next may also be specified by the operator command through the keyboard 5, or by selecting an item in the menu displayed on the CRT unit 4. According to this invention, when the OS switching is instructed by the operator command, the acceptance of the command can be determined depending on whether or not a job is still in execution at this moment.

The following describes in detail the OS loading operation with reference to the flow charts embodying the present invention. In this embodiment, the initial program loader is split into IPL-1 and IPL-2. The IPL-1 is resident in an end section 26 of the main storage 2 as shown in FIG. 3, while the IPL-2 is stored in the auxiliary storage 6 and it is loaded to an area 22 between a parameter storage area 21 and an OS storage area 23 in the main storage by execution of the IPL-1. Parameters in the area 21 indicate the state of a data storage area 25 used by the operating system and they are referenced when a new operating system is loaded to the area 23 by the OS switching operation so as to avoid the unnecessary loading of the same data set to the area 25.

Following the power-on operation or reset operation, the last address of area 26 is pointed. This address location stores the jump instruction to the top of the area 26, and thus the program IPL-1 is executed. As shown in the flow chart of FIG. 4, the IPL-1 verifies and initializes the areas 21 and 22 of the main storage in routine 100, and subsequently tests the entry of OS specification by the operator command in routine 102. If the entry of OS specification is sensed, file name "OS-XX" of the entered OS is set to one of general-purpose registers in routine 106, then in the subsequent routine 108 the IPL-2 stored in the auxiliary storage 6 is loaded to the area 22 of the main storage, and control is transferred to the top of the IPL-2. If the entry of the OS specification is not sensed in the decision routine 102, the file name of the predetermined standard operating system, i.e., "OS-1" in this example, is set to the register in routine 104.

In the IPL-2, the first routine 110 verifies the remaining portion of the main storage 6, and subsequently an operating system with the file name set in the general-purpose register is retrieved from the auxiliary storage 6 and loaded to the area 23 of the main storage in routine 112. At this time, a program INITIALIZER which loads data for the OS to the area 25 is stored in the end section 23' of the OS storage area. Following the OS loading operation, the OS-2 transfers control to the top of the INITIALIZER in routine 114.

In the INITIALIZER, the first routine 120 fetches parameters from the area 21, and the next routine 122 initializes the system hardware and OS program, as shown in FIG. 5. Subsequently, routine 124 loads data sets, which are needed for the operation of the OS and are not yet loaded in the region 25, from the auxiliary storage 6 to the main storage. Finally, in routine 126, the program transfers control to the top of the operating system in region 23. The OS loading operation is now completed, and the system is ready to run the processing program which is allocated in an area 24 of the main storage.

FIG. 6 shows in a flow chart the control program executed when the OS switching is instructed by the job control statement. In response to the detection of the OS switching statement by the job control, two routines OSCHK and OSCHG are executed successively. The routine OSCHK verifies the specified OS file name and device address in routine 130, and then the routine OSCHG is executed.

The routine OSCHG sets the specified OS file name to the general-purpose register in routine 140, and sets up parameters referenced by the INITIALIZER in the area 21 in routine 142. Thereafter, if the area 22 of the main storage still retains the IPL-2, control is transferred to routine 112 of IPL-2 in FIG. 4. However, the IPL-2 is not used any longer once the OS has been loaded and this area 22 can possibly be used as a work area of some operating system, and in this case the routine OSCHG, at least the portion of routines 146 and 148, is copied to the area 22 in routine 144 and these routines are executed successively. The routines 146 and 148 are identical to the routines 112 and 114 in IPL-2, and accordingly an operating system with the file name set in the general-purpose register is retrieved from the auxiliary storage 6 and loaded to the area 23 of the main storage, and finally control is transferred to the top of the INITIALIZER.

In the OS loading operation by the OSCHG routine, memory verification identical to routine 110 in IPL-2 is skipped. Since the state of the data area 25 is indicated by parameters during the execution of the routine OSCHG, the routine 124 in the INITIALIZER of FIG. 5 loads the area 25 with only data needed additionally by the new OS.

For switching operating systems using the operator command, the procedure is designed such that the routine OSCHK and OSCHG in FIG. 6 are executed in response to the detection of the OS switching command by the interrupt source analyzing routine. In this case, if a keyboard interrupt occurs during the execution of a job, the command may be ignored or may be responded to by the execution of OSCHK upon completion of the job, thereby preventing an improper job abortion.

Figure 7:
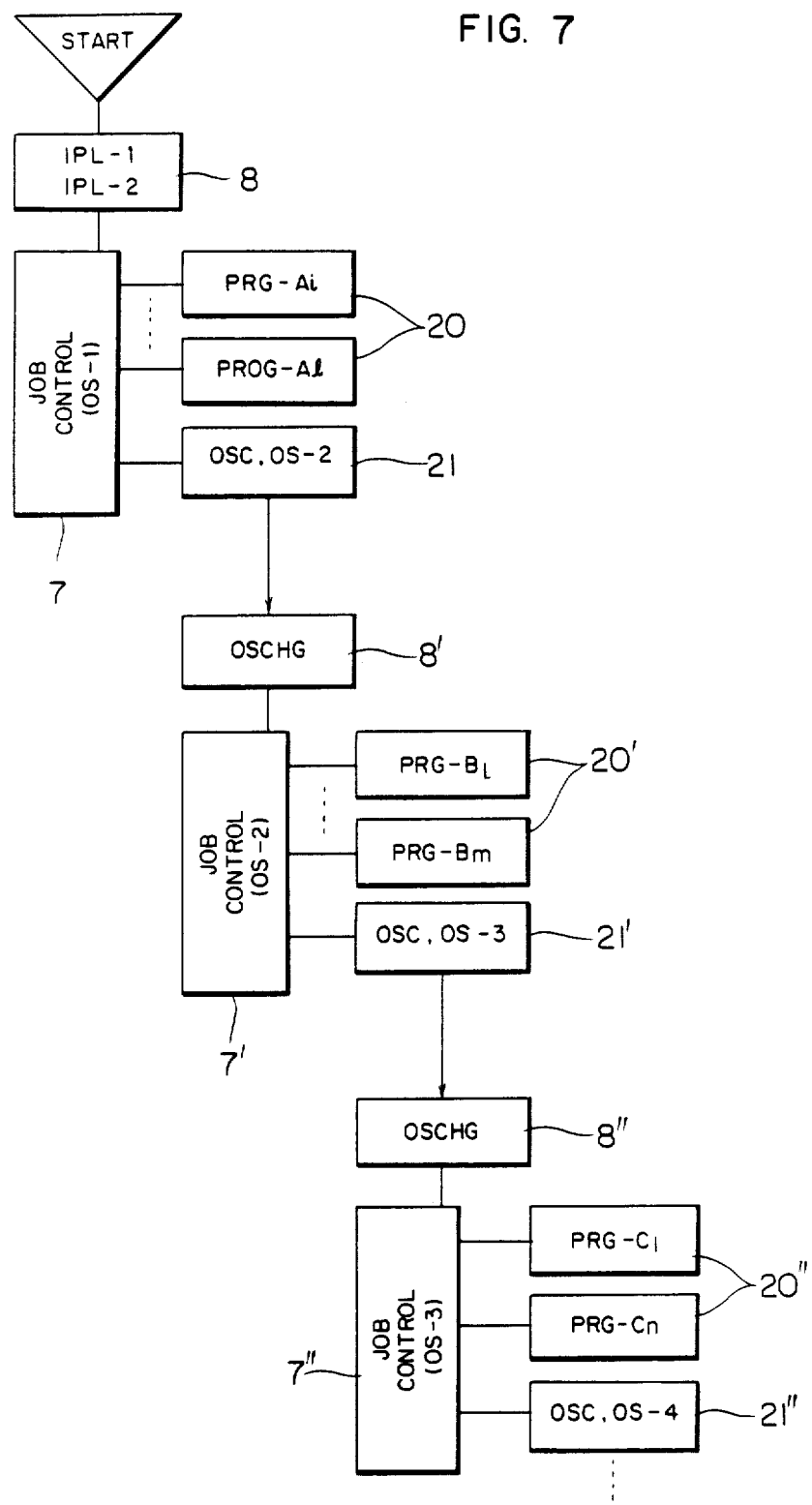
FIG. 7 is a flow chart showing changes in functions of the data processing system accomplished by the switching of operating systems.

FIG. 7 shows changes in the function of data processing system through the switching of operating system according to the present invention. At the initial start-up of the system, the IPL-1 and IPL-2 work the loading of OS-1 to the main storage, and a processing program 20 is run under control of the OS-1. When the replacement of operating system is instructed with the specification of a new OS name (OS-2) through the job control statement or the operator command 21, an OS switching routine 8' is executed under control of the OS-1 so that the OS-2 is loaded to the main storage. Under the new operating system OS-2, another processing program 20' is run. The OS-2 is also sensitive to the OS switching command, and when the switching to OS-3 is instructed, it executes OSCHG 8" so that the OS-3 is loaded to the main storage. Under the new operating system OS-3, another processing program 20" is run.

According to this invention, as described above, a single terminal device in on-line connection with the host computer can be used for multi-functional purposes through the selective use of several operating systems, in such a way that BTOS is used for an application program which needs a file transfer, EMP is used for running an application program which resides in the host computer, MS-DOS is used for dealing with data within a local office even though data from the host computer is possibly utilized subsidiarily, and WPS is used for documentation in an off-line mode. In operation, a job executed under way is protected from being aborted when OS switching is instructed abruptly, and the operator is rendered minimal waiting time in replacing the operating system.

We claim:
1. A method of switching from one operating system (OS) program to another OS program for a data processing system to provide a different function which comprises:
a processor;
first memory means for storing a plurality of OS programs each having a specified file name and a plurality of data sets;
second memory means having a first area for storing an OS program, a second area for storing a data set used by the OS program, a third area for temporarily storing a processing program to be executed, and a fourth area for storing a program which loads a selected one of OS programs in said first memory means to said first area of said second memory means, said first memory means being an externally provided auxiliary memory; and
control means including a data input device for instructing the loading of an OS program with a specified file name from said first memory means to said second memory means, so that the processing program stored in said third area of said second memory means is executed under control of the OS program loaded in said first area, said method comprising:
a first step of verifying an OS load instruction issued by said control means using a first program section in the OS program stored in said second memory means, and, if the OS load instruction is acceptable, preparing a parameter indicative of the content of said second area of said second memory means;
a second step of executing the program in said fourth step to load a new OS program with a file name specified by said control means from said first memory means to said first area of said second memory means; and
a third step of executing a second program section of the newly loaded OS program prior to execution of the processing program to load a data set which is necessary for the new OS program and is not present in said second area of said second memory means as a result of reference to a parameter prepared by the previous OS program.

2. A method according to claim 1, wherein said control means comprises a keyboard unit, and wherein said OS program loading instruction is entered as an operator command, sdid first step being carried out in response to a keyboard interrupt event at the entry of said operator command.

3. A method according to claim 2, wherein said control means comprises one of job control statements indicative of control procedures of the processing program, said first step being carried out in the form of execution of the job control statement.

4. A method of switching from one operating system (OS) program to another OS program for a data processing system which comprises:
a processor;
an external memory for storing a plurality of OS programs each having a specific file name, a plurality of data sets, and an operating system loader;
a main memory having a first area for storing an OS program, a second area for storing a data set used by the OS program, a third area for temporarily storing a processing program to be executed, a fourth area for storing the operating system loader, and a fifth area for permanently storing an initial program loader which loads an operating system loader from said external memory to said fourth area of said main memory; and OS control means for instructing the loading of an OS program with a specified file name from said external memory to said first area of said main memory, so that the processing program stored in said third area of said main memory is executed by said processor under control of the OS program loaded in said first area, each of the OS programs includes a first program section for verifying an OS load instruction issued by said OS control means and, if the instruction is acceptable, preparing a parameter indicative of the content of said second area and storing the parameter in a certain location in said main memory, and a second program section for loading a data set needed by the OS program from said external memory to said third area of said main memory, by making reference to the parameter, said method comprising:

first step of initiating a resident initial program loader following a power-ON operation of said data processing system to load an operating system loader stored in said external memory to said fourth area of said main memory;

a second step of executing a first section of the operating system loader in said fourth area to verify the first, second and third areas of said main memory and, thereafter, executing a second section of the operating system loader to load a specified OS program stored in said external memory to the first area of said main memory means;

a third step of executing the second program section of the OS program loaded to said main memory;

a fourth step of executing the first program section of the OS program loaded to said main memory and, thereafter, executing the second section of the operating system loader in the fourth area to load a new OS program stored in said external memory to said main memory when an OS load instruction is issued by said OS content means; and a fifth step of executing the second program section of the new OS program loaded in said fourth step so as to load a data set, which is needed by the new OS program and is not present in the second area, from said external memory to said main memory means.

5. A method according to claim 4, wherein each of said OS programs stored in said external memory includes a loader program for loading another OS program specified by said OS content means to a first area of said external memory, the OS program which resides in said main memory copying its own loader program in the fourth area of said main memory immediately following the execution of the first program section in said fourth step when the OS load instruction is issued by said OS control means.

6. A method according to claim 4, wherein said first step comprises a step of specifying an OS program by entering a file name thereof so that said specified OS program is loaded to said main memory in said second step.

7. A method according to claim 4, wherein said OS control means comprises a keyboard unit, and said OS program load instruction is entered as an operator command, said fourth step being carried out in response to a keyboard interrupt event at the entry of said operator command.

8. A method according to claim 5, wherein said OS control means comprises a keyboard unit, and wherein said OS program load instruction is entered as an operator command, said fourth step being carried out in response to a keyboard interrupt event at the entry of said operator command.

9. A method according to claim 4, wherein said OS control means comprises one of job control statements indicative of control procedures of said processing program, said fourth step being carried out in the form of execution of said job control statement.

10. A method according to claim 5, wherein said OS control means comprises one of job control statements indicative of control procedures of said processing program, said fourth step being carried out in the form of execution of said job control statement.

* * * * *